United States Patent [19]

Nickol

[11] 4,045,511

[45] Aug. 30, 1977

[54] MINIMUM ENERGY PROCESS FOR PREPARING BLOCK COPOLYMERS OF POLYAMIDES

[75] Inventor: Stephen L. Nickol, Wilmington, Del.

[73] Assignee: Suntech, Inc., Wayne, Pa.

[21] Appl. No.: 740,159

[22] Filed: Nov. 8, 1976

[51] Int. Cl.² .............................................. C08L 77/00
[52] U.S. Cl. ........................... 260/857 TW; 260/78 R; 260/78 A
[58] Field of Search ...................... 260/857 TW, 78 R

[56] References Cited

U.S. PATENT DOCUMENTS

| 2,577,621 | 12/1951 | May | 260/78 R |
|---|---|---|---|
| 3,397,107 | 8/1968 | Kimura | 161/173 |
| 3,499,853 | 3/1970 | Griebsch | 260/13 |
| 3,509,106 | 4/1970 | Lotz | 260/78 R |
| 3,549,724 | 12/1970 | Okazaki | 260/857 |
| 3,683,047 | 8/1972 | Honda | 260/857 TW |
| 3,729,449 | 4/1973 | Kimura | 260/78 R |
| 3,863,609 | 10/1974 | Kimura | 260/78 R |
| 3,882,090 | 5/1975 | Fagerburg | 260/78 R |

*Primary Examiner* — Paul Lieberman
*Attorney, Agent, or Firm* — J. Edward Hess; Donald R. Johnson; Anthony Potts, Jr.

[57] ABSTRACT

Process for preparing block copolymer involves dry blending salt of a prepolyamide, e.g. a 30203-6 salt, and particules of melt-spinnable polyamide. Blend is heated to a temperature in the range of between from the melting point of higher melting component to below amide-interchange temperature of a blend of the melt-spinnable polyamide and the homopolymer which would result from the polymerization of the salt. Heating and mixing are continued until substantially all of the salt and the polyamide are converted into a block copolymer. The latter can be used to make fibers.

6 Claims, 1 Drawing Figure

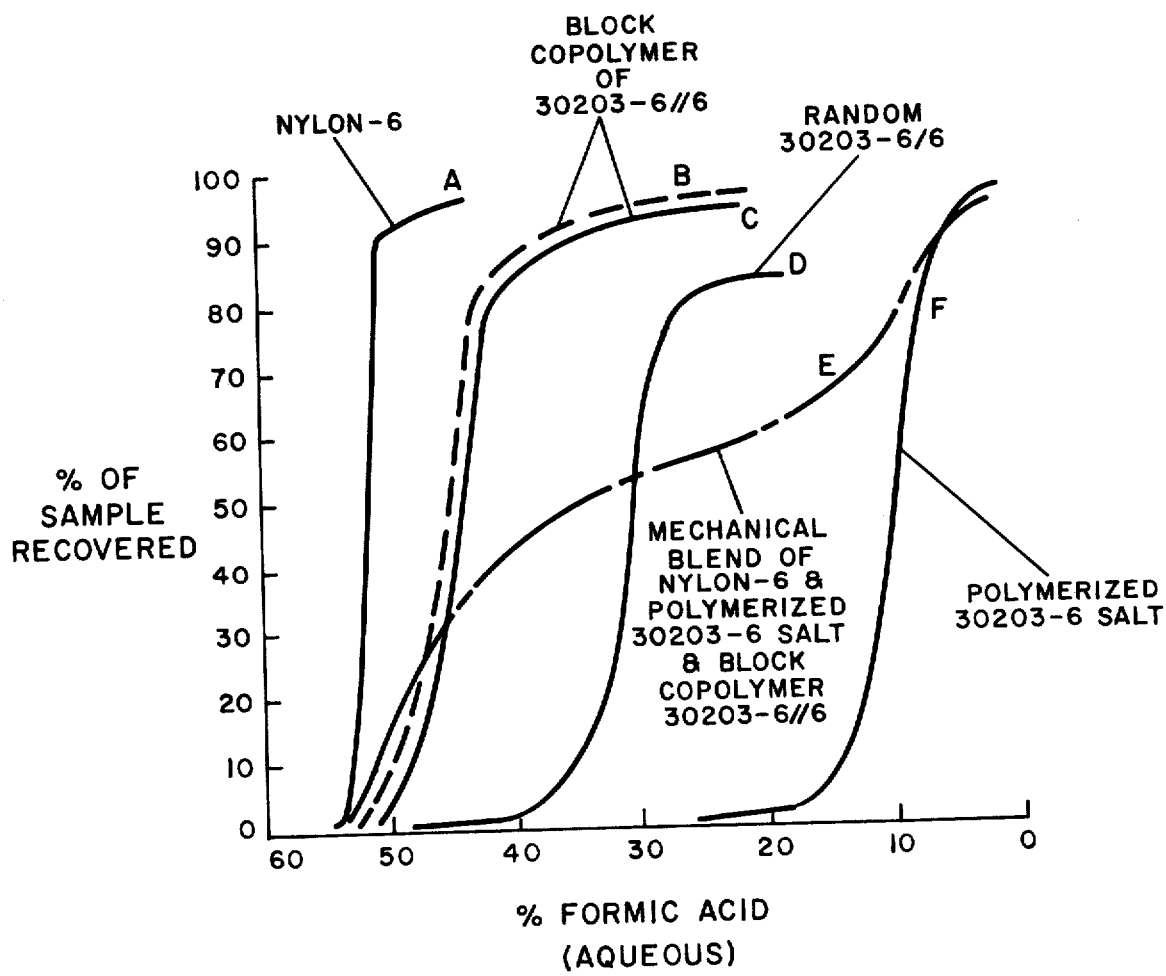

MINIMUM ENERGY PROCESS FOR PREPARING BLOCK COPOLYMERS OF POLYAMIDES

CROSS REFERENCE TO RELATED APPLICATIONS

This application is related to U.S. Patent Application Ser. No. 740,160 filed same data by applicant. Subject matter of related application is another method for forming block copolymers of polyamide.

BACKGROUND OF THE INVENTION

1. Field of Invention

A new and useful process is directed to forming a block copolymer. The process is more directed to the forming of a block copolymer of two different polyamides having utility, after further processing, for example, as a fiber. The copolymer comprises blocks of many monomeric repeating units of each of the different polyamides. By way of comparison, a copolymer can comprise random sequences of repeating units of each of the different polyamides. The latter can be referred to as a random copolymer. Furthermore, a block copolymer and a random copolymer formed from the same two different polyamides are known to possess different properties.

2. Description of the Prior Art

Block copolymers of polyamides and methods for preparing said copolymers are known, see U.S. Pat. No. 3,683,047, Honda et al, issued Aug. 8, 1972. One disclosed method for producing a block copolymer involves mixing two different polyamide polymers at a temperature above the amide-interchange temperature of the mixed polyamides until the block copolymer is formed. By way of comparison if the aforementioned mixing at said temperature is of further duration the resulting product is a random copolymer.

The molecular weight of each of the polyamides used to make a block copolymer via amide-interchange can be relatively high, for example, 50,000–100,000. It is believed that at above an amide-interchange temperature an exchange can occur between the two different polyamide molecules at any location where

exists. Thus it is possible that with two different polyamides, each of 50,000 molecular weight, the amide-interchange occurs right in the middle of the two molecules. As such a copolymer will have formed with one block having a molecular weight of 25,000 and the other block having an equal molecular weight while the copolymer still has a molecular weight of 50,000. Equally, the amide-interchange could occur towards one end of a polyamide and thus a copolymer could result having one segment, of say, 49,800 molecular weight derived from one polyamide, attached to another segment, of say, 200 molecular weight derived from the other polyamide. Because of apparent lack of control of where the amide-interchange will occur other methods have been suggested.

Honda et al suggests using two different low molecular weight, i.e. 1000–4000 polyamides. The polyamides are different, in part, in that one is an amino-terminated polyamide whereas the other is a carboxylic-terminated polyamide. The other difference resides in that the balance of the polyamides are also different. The aforementioned different polyamides are copolymerized at a temperature where amide-interchange or transamination is nominal while the reaction of amino-terminated groups with carboxylic-terminated groups occurs almost completely. The resulting product is a block copolymer wherein the blocks have essentially a molecular weight of the starting polyamide, i.e. 1000–4000.

The aforementioned methods require separate preparation of each of the starting components followed by remelting and mixing to make a block copolymer. This is a disadvantage.

SUMMARY OF THE INVENTION

Contrary to expectations based on the prior art it has now been found that a block polyamide copolymer can be formed using a dryblend of prepolyamide salt and particls of melt-spinnable polyamide as the starting components. Thus the separate preparation of one of the starting polyamides can be bypassed as well as its remelting. Also the premelting of the polyamide can also be bypassed. Thus heating requirements for this process are at a minimum.

Present process involves mixing the dry salt and dry particles of the polyamide at a temperature in the range of between from the melting point of the higher melting component to below the amide-interchange temperature of a blend of the melt-spinnable polyamide and the homopolymer which would result from the polymerization of the salt. The mixing at the elevated temperature continues until substantially all of the salt and the polyamide are converted into a block copolymer.

The resulting block copolymer can be converted into a fiber or monofilament which can be further converted to yarn or fabric, for example.

DESCRIPTION OF THE FIGURE

The accompanying FIGURE presents generalized curves for various kinds of polyamides that have been fractional precipitated from formic acid. The curves represented approximately the data reported in the Examples. Generally the curves demonstrate the different kinds of polyamides can be characterized by fractional precipitation from formic acid.

DESCRIPTION OF THE INVENTION

One of the components used as a starting material in this process is a salt selected from the group consisting of prepolyamides represented by the following formula:

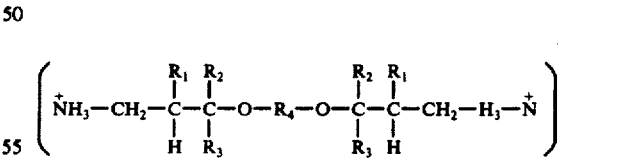

wherein $R_1$, $R_2$ and $R_3$ are selected from the group consisting of H, $C_1$–$C_{10}$ alkyls and $C_3$–$C_{10}$ isoalkyls;

$R_4$ is selected from the group consisting of $C_1$–$C_{10}$ alkylenes and $C_3$–$C_{10}$ isoalkylenes; and $R_5$ is selected from the group consisting of $C_6$-$C_{14}$ arylenes, $C_0$–$C_{10}$ alkylenes and $C_3$–$C_{10}$ isoalkylenes.

The foregoing solid salt can be referred to as a prepolyamide because upon heating under suitable conditions the salt loses water and forms a

linkage to form a polyamide.

The other component used as a starting material in this process is a melt-spinnable polyamide. The term "melt-spinnable polyamide" as used herein excludes the polyamide which could be formed by the aforementioned prepolyamide salt. Melt-spinnable refers to a process wherein the polyamer, a polyamide, is heated to above its melting temperature and while molten forced through a spinneret. The latter is a plate containing from one to many thousands of orifices, through which the molten polymer is forced under pressure. The molten polymer is a continuous filament and depending on the number of orifices many filaments can be formed at the same time. The molten filaments are cooled, solidified, converged and finally collected on a bobbin. This technique is described in greater detail in ENCYCLOPEDIA OF POLYMER SCIENCE AND TECHNOLOGY, Vol. 8, Man-Made Fibers, Manufacture.

Polyamides which are crystallizable and have at least a 30° C difference between melting point and the temperature at which the molten polymer undergoes decomposition can be melt spum. Examples of melt-spinnable polyamides are as follows: nylon-6,6 (also known as poly(hexamethylene) adipamide); nylon-6,10 (poly(hexamethylene sebacamide)); nylon-6 (poly(pentamethylene carbonamide)); nylon-11 (poly(decamethylene carbonamide)); MXD-6 (poly (methaxylylene adipamide)); PACM-9 (bis(paraminocyclohexyl) methane azelamide)); PACM-10 (bis(paraminocyclohexyl) methane sebacamide)); and PACM-12 (bis(paraminocyclohexyl) methane dodecanoamide)); others are listed in ENCYCLOPEDIA OF POLYMERS SCIENCE AND TECHNOLOGY, Vol. 10, Section Polyamide Fibers, table 12. Methods for preparing these polyamides are well known and described in numerous patents and trade journals.

The amount of salt present relative to the amount of the melt-spinnable polyamide can vary within a broad range. If however, too much of either component is used then the resulting copolymer is not a block copolymer. Rather it is a copolymer consisting of mostly long chains of the most prevalent component bridged together by relatively short segments of the lesser component arranged in a statistically random fashion. And differences between a random and a block copolymer can be demonstrated by comparing physical properties of the two. For this invention an operative range of the amount of salt to the total weight of the components is between from about 10 weight % to about 75 weight % with about 20 weight % to about 40 weight % preferred.

The process involves blending the dry prepolyamide salt with dry particles of the melt-spinnable polyamide. The resulting blend is then heated in an inert atmosphere. The temperature to which it is heated is in the range of between from the melting point of the higher melting component of the blend to below about the amide-interchange temperature of a blend of the melt-spinnable polyamide and the polyamide which would result from the polymerization of the salt. The lower temperature is defined by the melting point of either the melt-spinnable polyamide or the salt whichever is higher.

The upper temperature for the process is an amide-interchange temperature. In this process one of the polyamides which could have such an interchange is the melt-spinnable polyamide. The other material would be a polyamide formed from the prepolyamide salt. Thus if the latter polyamide was formed and mixed with the melt-spinnable polyamide there would be a temperature below which amide-interchange would not occur between the two or be so nominal as not to form a block copolymer. Amide-interchange refers to the reaction where an

in one polyamide (labeled A in the following illustration) reacts with a polyamide (labeled B in the following illustration) so that the following is representative of the end result;

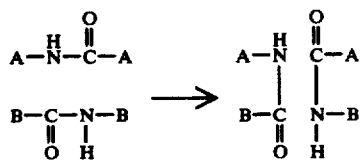

Amide-interchange is the mechanism by which a block copolymer is formed by a process known as melt blending.

The heated blend of the salt and the melt-spinnable polyamide is mixed within the aforementioned temperature range and under an inert atmosphere. The mixing at the elevated temperature continues until substantially all of the salt and the polyamide are converted to a block polymer. Samples of the mixture can be taken during processing and tested to determine when the conversion is essentially completed. One of the testing methods is described in the Examples.

When substantially all of the salt and the polyamide are converted to a block copolymer the resulting copolymer can be represented by the following structure:

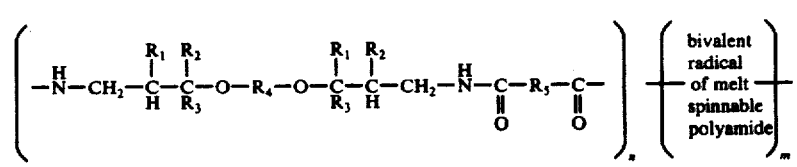

wherein the R's are as heretofore defined. The subscripts $n$ and $m$ refer to the relative amounts of each present. Thus the percentage, $n/n+m$ (100), is between from about 10 weight % to about 75 weight % for the operative range. Nominal amounts of unreacted salt or melt-spinnable polymide can remain, however, its effect on the resulting properties of the block copolymer would be negligible. Furthermore any unreacted component could be converted during further processing of the block copolymer, for example, conversion to a fiber. On the other hand it could be removed by various means.

As shown in the foregoing structure for the block copolymer the melt-spinnable polyamide is present in its bivalent radical form. The bivalence results from the coupling of

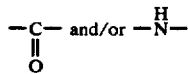

groups within the melt-spinnable polyamide with the

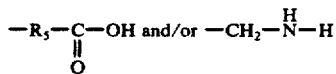

of the salt.

The following examples describe how certain block polyamide copolymers were prepared using present invention. Also described are comparisons with block copolymers of similar polyamides prepared by other methods. Also comparisons are made with polyamides and random polyamide copolymers.

EXAMPLES

A salt having the following structure:

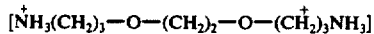

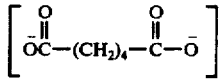

which can be referred to as a 30203-6 salt, was used as a component and prepared in the following manner. First 1,2-bis($\beta$-cyanoethoxyethane), having the following structure: NC—(CH$_2$)$_2$—O—(CH$_2$)$_2$—O—(CH$_2$)$_2$—CN, was prepared. To prepare it, a 5 liter double walled (for water cooling) glass reactor with a bottom drain and stopcock was charged with 930 grams (15 moles) of ethylene glycol and 45.6 grams of 40% aqueous KOH solution. Some 1620 grams (30.6 moles) of acrylonitrile (NC—CH=CH$_2$) were then added dropwise with stirring at such a rate that the temperature was kept below 35° c. After the addition was completed the mixture was stirred an additional hour and allowed to stand overnight. The mixture was neutralized to a pH of 7 by the addition of 6 molar HCl. After washing with a saturated NaCl solution three times, the product was separated from the aqueous layer, dried over CaCl$_2$ and passed through an Al$_2$O$_3$ column to insure that all basic materials had been removed. The yield was 90% of theoretical.

The next step was the preparation of 4,7-dioxadecamethylenediame (NH$_2$(CH$_2$)$_3$—O—(CH$_2$)$_2$—O—(CH$_2$)$_3$NH$_2$). Into an 800 milliliter hydrogenation reactor was charged 150 grams of 1,2-bis($\beta$-cyanoethoxyethane), 230 milliliters of dioxane and about 50 grams Raney Co. After purging the air, the reactor was pressurized with hydrogen up to 2000 p.s.i. and heated to 110° C. As the hydrogen was consumed additional hydrogen was added until the pressure remained constant. Upon cooling, the pressure was released and the catalyst was filtered. The dioxane was removed by atmospheric distillation. The remaining mixture was distilled using a 3 foot spinning band distillation unit. The diamine distilled at 123°–124° C and 3.75 mm Hg. About 98 grams of 99.5% pure material were obtained. The resulting material can be referred to as a 30203 diamine.

The next step was the preparation of the salt. To a solution of 41.50 grams of adipic acid dissolved in a mixture of 250 milliliters of isopropanol and 50 milliliters of ethanol were added, with stirring, 50 grams of the 30203 diamine dissolved in 200 milliliters of isopropanol. An exothermic reaction occurred. Upon cooling, a polymer salt crystallized out of solution. The salt was collected on a Buchner funnel and subsequently recrystallized from a mixture of 400 milliliters of ethanol and 300 milliliters of isopropanol solution. The product, dried in vacuo overnight at 60° C, had a melting point of 127°–128° C and a pH of a 1% solution was 6.9. 85 grams (92% yield of theoretical) of the salt was obtained.

The block copolymer was prepared in the following manner. Seventeen and one tenth grams of dry 30203-6 salt and 40 grams of dry, ground nylon-6 were dry blended in a suitable container using a ball mill roller. After blending the resulting blend was added to a vessel fitted with a stirrer. The vessel and its contents were purged with dry nitrogen. The vessel was inserted into a vapor bath maintained at 245° C and kept under a positive pressure of nitrogen. Once the mixture becomes molten it was stirred for 1 hour. After cooling, the resulting block copolymer was analyzed as to its structure.

The method used to analyze the polymer structure involved the fractional precipitation of the polymer in formic acid. Generally the method was as follows: one gram of dry polymer (copolymer, random or block or homo) was weighed to the nearest tenth of a milligram. The one gram sample was dissolved in a standardized formic acid (i.e. 90% formic acid). The resulting solution was diluted with distilled water to a given % formic acid, e.g. 55% formic. The solution was allowed to stand at ambient temperature for three hours and then filtered. The collected precipitate was then washed with water, dried and weighted to give the % sample recovered at that particular formic acid concentration. A graph was then constructed by plotting the % of the sample recovered vs. formic acid concentration. The different polymers, i.e. random copolymer, block copolymer, homopolymer (e.g. nylon-6) each have different solubilities in formic acid. Thus each gave a different characteristic curve.

Accompanying Table I, contains the recovery data for nylon-6, polymerized 30203-6 salt, and a physical mixture of equal amounts of nylon-6, polymerized 30203-6 salt, and block 30203-6//6polymer prepared by melt blending; and random 30203-6/6 copolymer. Also shown for the mixture are calculated values based on what the expected values would be based on the recovery curves for the individual polymers. Accompanying Table II contains recovery data for four 30303-6116 block copolymers prepared by melt blending and two block 30203-6116 copolymers prepared by this invention.

TABLE I

Precipitation of Various Polyamides in Formic Acid

| | % Recovered | | | | | | |
|---|---|---|---|---|---|---|---|
| | Nylon 6+ | | Polymerized 30203-6+ | | Mixture of 3 Polyamides* | | Random 30203-6/6 |
| % Formic Acid | 1 | 2 | 1 | 2 | Observed | Calculated | |
| 60 | 0 | 0 | — | — | 0 | 0 | — |
| 57 | — | 0 | — | — | — | — | — |
| 56 | 95.4 | — | — | — | — | — | — |
| 55 | — | 92.2 | — | — | 36.1 | 31.9 | 0 |
| 50 | 96.5 | 93.8 | — | — | 39.3 | 32.2 | 0.2 |
| 47 | — | — | — | — | — | — | 0.4 |
| 45 | 97.5 | 95.1 | — | — | 53.7 | 44.0 | — |
| 44 | — | — | — | — | — | — | 5.1 |
| 41 | — | — | — | — | — | — | 11.7 |
| 40 | — | — | — | — | 61.4 | 61.1 | — |
| 38 | — | — | — | — | — | — | 23.8 |
| 35 | — | — | — | — | 62.2 | 62.1 | — |
| 32 | — | — | — | — | — | — | 62.2 |
| 30 | 98.4 | 96.4 | 0 | 0 | — | — | — |
| 29 | — | — | — | — | — | — | 71.1 |
| 26 | — | — | — | — | — | — | 79.7 |
| 25 | — | — | — | — | 63.8 | 62.8 | — |
| 23 | — | — | — | — | — | — | 81.5 |
| 20 | — | — | — | 0.4 | 63.9 | 63.3 | 82.8 |
| 15 | — | — | 0.7 | 0.7 | 67.5 | 64.2 | — |
| 10 | — | — | ** | 47.8 | 69.6 | 69.4 | — |
| 5 | — | — | 86.7 | 83.6 | 86.5 | 80.6 | — |
| 2 | — | — | ** | 89.4 | 86.5 | 81.0 | — |

Notes
+Sample 1 based on 2 grams whereas sample 2 is based on 1 gram
*Mixture consists of 1 gram each of nylon 6, polymerized 30203-6 and block 30203-6/6
**Sample taken but result was believed to be erroneous.

Both the data in Table I and the representative curve (line A) in the FIGURE shows the almost all of the nylon-6 is recovered when the % of formic acid is decreased to about 55–56%. In contrast with the polymerized 30203-6 salt, represented by line F, none of polyamide precipitates until the formic acid concentration is down to about 15%. The data for the polymerized salt is given in Table I.

Both tha data in Table I and the representative curve (line D) in the FIGURE, also indicates that the precipitation of a random 30203-6/6 copolymer does not occur until about a 45% of concentration of formic acid is reached. Furthermore in contrast to the nylon-6, which has an almost perpendicular recovery line (except for the top portion), the slope of the recovery curve for the random copolyamide is much more gradual.

The DSC (Differential Scanning Calorimeter) curves for the block copolymers, prepared by this process, showed the absence of endothermic peaks corresponding to either the melting of 30203-6 salt or 30203-6 polymer. Further the block copolymer, prepared by this process, had endothermics which corresponded to those shown by 30203-6//6 block copolymers prepared by melt blending. Finally the block copolymers had melting points more than 40° C above that observed for a random copolymer of the same overall composition. Thus this comparison indicates that block polyamide copolymers can be prepared by this invention.

Some of the foregoing polymers were also characterized by DSC melting points. In particular melting points were obtained for nylon-6, random 30203-6/6 and the block 30203-6//6 copolymers prepared by the invention. The DSC and inherent viscosities are given in the accompanying Table III.

TABLE III

| | PHYSICAL CONSTANTS | | |
|---|---|---|---|
| | DSC ° C | | Inherent |
| Material | Onset | Peak | Viscosity |
| Nylon-6 | 210 | 222 | 1.03 |
| Random 30203-6/6 | 138 | 161 | 0.81 |
| Block 30203-6//6 | | | |

TABLE III-continued

| | PHYSICAL CONSTANTS | | |
|---|---|---|---|
| | DSC ° C | | Inherent |
| Material | Onset | Peak | Viscosity |
| Sample 7 | 186 | 207 | 0.86 |
| Sample 8 | 193 | 208 | 0.78 |

Differences between polymers in melting temperatures reflect differences in block sizes whereas difference in viscosities reflect differences in molecular weights.

Recovery line E represents what happens when a mechanical blend of nylon-6, polymerized 30203-6 salt, and block 30203-6//6 is precipitated from a solution in formic acid. The actual recovery data for the blend is almost equal to a calculated recovery amount based on the actual recovery data for the individual polymers when taking into consideration the amount of each polymer used to make the mechanical blend. The actual recovery data and calculated values are shown in Table I.

In general then the foregoing comparison of the different recovery curves for the different polyamides indicate that the different polymers can be characterized by their solubility in formic acid.

Table II contains data for four different block 30203-6//6 copolymers. The latter, samples 3, 4, 5 and 6, were prepared by melt blending of nylon-6 and 30203-6 polymer for various lengths of time. Table II also contains the recovery data for two blocks 30203-6//6 copolymers, samples 7 and 8, prepared by this invention.

Comparison of recovery lines for 30203-6//6 copolymers prepared by melt blending with those by present invention indicate that the latter method results in a block copolymer. The recovery lines are representative lines B and C in the FIGURE. Line B represents a composite recovery curve of 30203-6//6 block copolymer prepared by melt blending 30203-6 polyamide and nylon-6 at 282° C for about 2–3 hours. Line C represents the recovery curve of a block copolymer prepared by this invention. The small difference between lines B and C is believed to represent an experimental different rather than a difference of structure. Changes in processing for either or both of the block copolymers could change the % recovery. Support for this resides in the fact that other block copolymers prepared by this invention have recovery curves which were to the left of line B.

Analogous results, as described heretofore, will be obtained when different salts, other than a 30203-6 salt, such as 30403-6, 30603-8, and 30103-14 are used. Also similar results will be obtained when other temperatures are also used. Also, similar results will be obtained when some other $C_0$-$C_{10}$ alkylene or a $C_3$-$C_{10}$ isoalkylene or a $C_6$-$C_{14}$ arylene is used in place of the tetramethylene ($R_5$) used in the example. Examples of the heretofore mentioned $C_0$-$C_{10}$ alkylenes and $C_3$-$C_{10}$ isoalkylenes include ethylene, trimethylene, isopropylidene, isobutylidene, and the like. Examples of the heretofore mentioned $C_6$-$C_{14}$ arylenes include naphthylene, phenylene, tolylene, and the like. The previously mentioned $C_1$-$C_{10}$ alkyls include methyl, ethyl, propyl, butyl, pentyl, hexyl, heptyl, octyl, nonyl, and decyl and use of such groups, in place of the hydrogen used in $R_1$, $R_2$, and $R_3$, in the example, along with isoalkyls will also yield similar results. Use of any one of the aforementioned alkylenes or the isoalkylenes in place of the ethylene used in $R_4$ in the example will also yield similar results.

TABLE II

PRECIPITATION OF VARIOUS BLOCK POLYAMIDES IN FORMIC ACID

| | % Recovered | | | | | |
|---|---|---|---|---|---|---|
| | Melt Blend | | 30203-6//6* | | By this invention 30203-6//6+ | |
| % Formic Acid | 3 | 4 | 5 | 6 | 7 | 8 |
| 55 | 58.5 | 0 | 0 | 0 | 0 | 0 |
| 50 | 73.2 | 53.1 | 0 | 0 | 2.7 | 0 |
| 47 | 82.9 | 69.9 | 24.7 | 0.9 | 39.1 | 35.3 |
| 44 | 86.5 | 84.7 | 58.7 | 6.7 | 64.3 | 70.7 |
| 41 | 87.9 | ** | 77.7 | 62.2 | 79.5 | 82.2 |
| 38 | 88.5 | 89.9 | 85.2 | 72.5 | 82.9 | — |
| 35 | 88.9 | 92.2 | 88.5 | 79.2 | 85.8 | 89.0 |
| 32 | 89.5 | 93.1 | 89.5 | 82.5 | 88.4 | 91.6 |
| 29 | 90.0 | 93.5 | 90.5 | 86.1 | 88.5 | 92.3 |
| 26 | 90.7 | 93.5 | 91.6 | ** | 90.1 | 93.0 |
| 23 | 89.3 | 94.0 | ** | ** | 90.6 | 93.1 |
| 20 | 90.1 | 94.5 | 93.3 | 87.6 | 90.6 | 94.9 |

*Samples prepared by melt blends of 70% nylon-6 and 30% 30203-6 polymer. Samples 3, 4, 5 and 6 were melt blended at 283° C. for 15, 60, 180 and 360 minutes, respectively.
**Indicates sample taken but result was believed to be erroneous.
+Samples prepared using 70% nylon-6 and 30% 30203-6 salt.

The invention claimed is:

1. A process for forming a block polyamide copolymer comprising:
   a. blending dry particles of a melt-spinnable polyamide and a dry salt selected from the group consisting of prepolyamides represented by the formula:

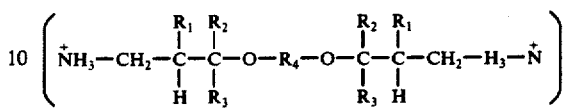

wherein $R_1$, $R_2$ and $R_3$ are selected from the group consisting of H, $C_1$-$C_{10}$ alkyls and $C_3$-$C_{10}$ isoalkyls;

$R_4$ is selected from the group consisting of $C_1$-$C_{10}$ alkylenes and $C_3$-$C_{10}$ isoalkylenes; and $R_5$ is selected from the group consisting of $C_6$-$C_{14}$ arylenes, $C_0$-$C_{10}$ alkylenes and $C_3$-$C_{10}$ isoalkylenes; wherein the salt content amounts to between from about 10 weight % to about 75 weight % of the total weight;

b. heating in an inert atmosphere resulting blend of the salt and the polyamide to a temperature in the range of between from the melting point of higher melting component to below about amide-interchange temperature of a mix of the melt spinnable polyamide and polyamide which would result from the polymerization of the salt; and c. mixing the heated blend at the aforementioned temperature and in the inert atmosphere, until substantially all of the salt and the polyamide are converted to the block polyamide copolymer.

2. Process according to claim 1 wherein the salt content amounts to between from about 20 weight % to about 40 weight % of the total weight.

3. Process according to claim 1 wherein $R_1$ and $R_2$ and $R_3$ are H.

4. Process according to claim 3 wherein $R_4$ is a $C_2$ alkylene.

5. Process according to claim 4 wherein $R_5$ is a $C_6$ arylene.

6. Process according to claim 5 wherein the temperature of mixing is about 245° C.